United States Patent
Lai et al.

(10) Patent No.: US 11,867,562 B2
(45) Date of Patent: Jan. 9, 2024

(54) OPTICAL DEVICES

(71) Applicant: VisEra Technologies Company Limited, Hsin-Chu (TW)

(72) Inventors: Lai-Hung Lai, Hsin-Chu (TW); Chin-Chuan Hsieh, Hsin-Chu (TW); Chien-Ho Yu, Hsin-Chu (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 0 days.

(21) Appl. No.: 17/583,676

(22) Filed: Jan. 25, 2022

(65) Prior Publication Data

US 2023/0236066 A1 Jul. 27, 2023

(51) Int. Cl.
*G01J 5/08* (2022.01)
*G01J 5/0806* (2022.01)
*G01J 5/20* (2006.01)
*G02B 5/08* (2006.01)
*G02B 5/20* (2006.01)
*G02B 27/30* (2006.01)

(52) U.S. Cl.
CPC ............ *G01J 5/0879* (2022.01); *G01J 5/0806* (2013.01); *G01J 5/0896* (2013.01); *G01J 5/20* (2013.01); *G02B 5/0858* (2013.01); *G02B 5/208* (2013.01); *G02B 27/30* (2013.01)

(58) Field of Classification Search
CPC ...... G01J 5/0879; G01J 5/0806; G01J 5/0896; G01J 5/20; G02B 5/0858; G02B 5/208; G02B 27/30
See application file for complete search history.

(56) References Cited

U.S. PATENT DOCUMENTS

| | | | |
|---|---|---|---|
| 6,794,196 B2 * | 9/2004 | Fonash | G01N 27/44717 436/151 |
| 10,345,239 B1 | 7/2019 | Sinha et al. | |
| 11,476,082 B1 * | 10/2022 | Bloom | H01J 37/265 |
| 11,544,873 B2 * | 1/2023 | Chen | G06T 17/00 |

(Continued)

FOREIGN PATENT DOCUMENTS

| | | |
|---|---|---|
| CN | 210923959 U | 7/2020 |
| CN | 111879422 A | 11/2020 |

(Continued)

OTHER PUBLICATIONS

Yakunin et al., "High-resolution remote thermography using luminescent low-dimensional tin-halide perovskites," Arxiv. Org, Cornell University Library, May 21, 2019, 52 pages.

(Continued)

*Primary Examiner* — David P Porta
*Assistant Examiner* — Gisselle M Gutierrez
(74) *Attorney, Agent, or Firm* — Muncy, Geissler, Olds & Lowe, P.C.

(57) ABSTRACT

An optical device is provided. The optical device includes a time-of-flight (TOF) sensor array, a photon conversion thin film, and a light source. The photon conversion thin film is disposed above the time-of-flight sensor array. The light source emits light with a first wavelength towards the photon conversion thin film to be converted into light with a second wavelength received by the time-of-flight sensor array. The second wavelength is longer than the first wavelength.

19 Claims, 9 Drawing Sheets

(56) References Cited

U.S. PATENT DOCUMENTS

| | | | |
|---|---|---|---|
| 2018/0166488 A1* | 6/2018 | Sugizaki | H01L 27/14 |
| 2018/0233521 A1 | 8/2018 | Na et al. | |
| 2018/0335555 A1* | 11/2018 | Wang | G02B 5/281 |
| 2018/0366519 A1* | 12/2018 | Saito | H10K 85/113 |
| 2019/0013469 A1* | 1/2019 | Miyashita | C07C 211/61 |
| 2019/0035956 A1* | 1/2019 | Wada | H01L 31/04 |
| 2019/0146088 A1 | 5/2019 | Pacala et al. | |
| 2020/0183064 A1* | 6/2020 | Mori | G02B 5/208 |
| 2020/0191919 A1* | 6/2020 | Gopal Krishnan | G02B 5/1895 |
| 2021/0082661 A1* | 3/2021 | Bloom | H04N 23/75 |
| 2021/0166408 A1* | 6/2021 | Kim | H04N 23/951 |
| 2021/0193740 A1* | 6/2021 | Saito | H10K 30/30 |
| 2021/0408413 A1* | 12/2021 | Yokoyama | H10K 30/81 |
| 2022/0011435 A1 | 1/2022 | Palermo | |

FOREIGN PATENT DOCUMENTS

| | | |
|---|---|---|
| CN | 113835081 A | 12/2021 |
| TW | 201816422 A | 5/2018 |

OTHER PUBLICATIONS

Bhandari et al., "Blind and reference-free fluorescence lifetime estimation via consumer time-of-flight sensors," Optica, vol. 2, No. 11, Nov. 10, 2015, 10 pages.

Bonjour et al., "CMOS Demodulation Image Sensor for Nanosecond Optical Waveform Analysis," IEEE Sensors Journal, vol. 13, No. 5, May 2, 2013, 12 pages.

European Search Report dated Sep. 12, 2022 in EP Application No. 22162884.5, 9 pages.

\* cited by examiner

OPTICAL DEVICES

BACKGROUND OF THE INVENTION

Field of the Invention

The invention relates to an optical device, and more particularly to an optical device integrated by at least a time-of-flight (TOF) sensor, a photon conversion thin film and a light source.

Description of the Related Art

Thermal image sensors are widely applied in medical detection, human body temperature detection, industrial non-destructive testing, and process monitoring, for example. The thermal image sensor has ability to detect long-wavelength infrared (LWIR) in the range of 7-14 μm.

There are two main technologies right now in the market for thermal imaging. First, a 2D array of microbolometers that employ an IR absorber layer connecting to a temperature sensitive resistor made from $VO_X$ or amorphous Si layers bridged between two electrodes with an airgap of ~2 μm above the IR reflector. The structure of bridge makes microbolometer difficult to shrink, limiting the pixel size and resolution. On the other hand, it suffers low accuracy (±3°) problem. Second technology is employing a LWIR photon to electric conversion layer such as HgCdTe connecting to CMOS readout circuit array. To make the image sensor reach higher accuracy, these LWIR photon to electric conversion layers always need a cooling system to reduce the thermal noise. In addition, since current sensing materials such as HgCdTe cannot be integrated into 8" and 12" silicon technology, mass production is difficult. It makes HgCdTe image sensor bulky size, high cost and high power consumption, so only used in military application.

Therefore, development of an ultra-thin, high resolution, highly accuracy and low cost thermographic device is desirable.

BRIEF SUMMARY OF THE INVENTION

In accordance with one embodiment of the invention, an optical device is provided. The optical device includes a time-of-flight (TOF) sensor array, a photon conversion thin film, and a light source. The photon conversion thin film is disposed above the time-of-flight sensor array. The light source emits light with a first wavelength towards the photon conversion thin film to be converted into light with a second wavelength received by the time-of-flight sensor array. The second wavelength is longer than the first wavelength.

In some embodiments, the time-of-flight sensor array includes a silicon time-of-flight sensor, a germanium (Ge) time-of-flight sensor, an indium gallium arsenide (InGaAs) time-of-flight sensor, an organic photodiode (OPD) time-of-flight sensor or a perovskite time-of-flight sensor.

In some embodiments, the optical device further includes an optical component group disposed on the time-of-flight sensor array. The optical component group includes a pinhole-type collimator and a filter disposed on the pinhole-type collimator. In some embodiments, the pinhole-type collimator is disposed on the filter. In some embodiments, the filter includes a longpass (LP) filter or a narrow bandpass (NBP) filter. In some embodiments, the optical device further includes a plurality of microlenses disposed on the optical component group.

In some embodiments, the photon conversion thin film includes organic materials, inorganic materials or organic-inorganic-hybrid materials forming a zero-dimensional, a one-dimensional, a two-dimensional or a bulk structure. In some embodiments, the photon conversion thin film absorbs short-wavelength photons and emits long-wavelength photons. In some embodiments, the photon conversion thin film has a temperature-dependent photoluminescence lifetime.

In some embodiments, the photon conversion thin film is pixelated with different color conversion materials or with the same color conversion material. In some embodiments, when the photon conversion thin film is pixelated with the same color conversion material, there is an air gap between the adjacent pixelated photon conversion thin film.

In some embodiments, the light source is disposed adjacent to the time-of-flight sensor array.

In some embodiments, the light source is disposed between the time-of-flight sensor array and the photon conversion thin film. In some embodiments, the optical device further includes a waveguide connected to the light source. In some embodiments, the optical device further includes a light guide plate (LGP) connected to the light source. In some embodiments, the light source includes a semi-transparent organic light-emitting diode (OLED) or semi-transparent Perovskite light-emitting diode.

In some embodiments, the light source is disposed in the time-of-flight sensor array. In some embodiments, the optical device further includes a diffuser disposed on the light source.

In some embodiments, the optical device further includes a longpass filter disposed on the photon conversion thin film. In some embodiments, the longpass filter allows light with a wavelength longer than 7,000 nm to pass through, and blocks ambient light.

In some embodiments, the optical device further includes a module lens disposed above the photon conversion thin film. In some embodiments, the module lens allows light with a wavelength longer than 7,000 nm to pass through and focuses heat on the photon conversion thin film.

In some embodiments, the optical device further includes a thermal insulator disposed between the light source and the photon conversion thin film.

In some embodiments, the light source includes a light-emitting diode (LED) or a laser diode connected to the waveguide. In some embodiments, the light source includes a light-emitting diode (LED) or a laser diode connected to the light guide plate. In some embodiments, the light-emitting diode (LED) and the laser diode emit periodic pulse light or modulated sine wave light.

In some embodiments, emission of signals of the periodic pulse light is synchronized with operation of a readout circuit, and the signals are read at various times by the readout circuit and converted into digital signals via an A/D converter, and the photoluminescence lifetime of the photon conversion thin film is calculated using equation (I) and converted into a temperature map.

$$\tau = -t/\ln\left(\frac{I(t)}{I(0)}\right) \qquad (I)$$

In equation (I), t represents time. I(0) represents initial signal intensity, I(t) represents signal intensity at time t, and τ represents photoluminescence lifetime.

In some embodiments, emission of signals of the modulated sine wave light is synchronized with operation of a readout circuit, and the signals are read at various phase delays by the readout circuit and converted into digital signals via an A/D converter, and the photoluminescence lifetime of the photon conversion thin film is calculated using equations (II) and (III) and converted into a temperature map.

$$\Delta\phi = \arctan\left(\frac{I_0 - I_2}{I_3 - I_1}\right) \quad \text{(II)}$$

In equation (II), $I_0$ represents signal intensity at 0° phase delay, $I_1$ represents signal intensity at 90° phase delay. $I_2$ represents signal intensity at 180° phase delay. $I_3$ represents signal intensity at 270° phase delay, and $\Delta\varphi$ represents phase difference between the light source and photon emitted from the photon conversion thin film.

$$\tau = \frac{\tan(\Delta\phi)}{2\pi v} \quad \text{(III)}$$

In equation (III), v represents light source modulation frequency, and T represents photoluminescence lifetime.

In the present invention, the optical device (i.e. thermal imaging sensor) is integrated by at least a time-of-flight (TOF) sensor, a photon conversion thin film (with the specific material and composition) and a light source. The photon conversion thin film absorbs the heat of the object to form the distribution of different heat zones. The light source emits a short-wavelength light (for example, blue light) to excite the photon conversion thin film to be converted into a long-wavelength light (for example, red light) received by the time-of-flight sensor. In the photon conversion thin film, the zone with a higher temperature emits light faster than the zone with a lower temperature. The time-of-flight sensor measures the light-achieving time and calculates the heat map according to the transfer relation. Thanks to the current semiconductor technology, the present optical design can reduce the size of the device and improve temperature resolution.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
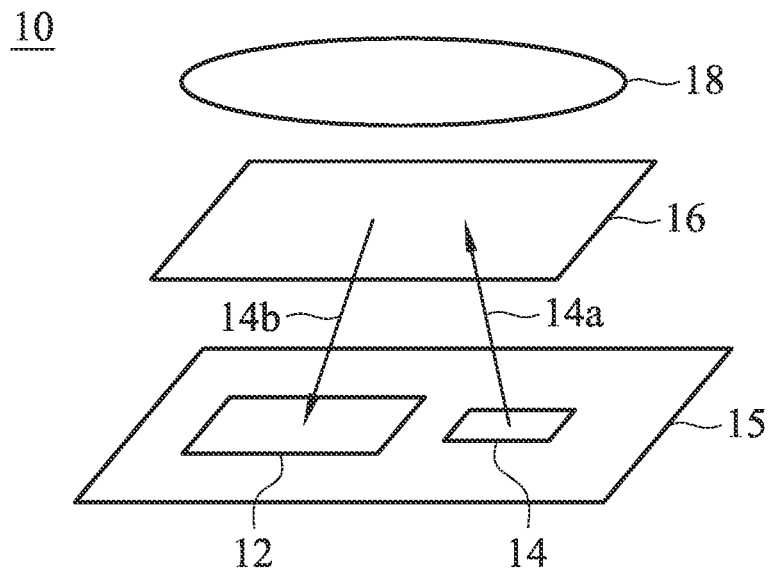
FIG. 1 shows a schematic diagram of an optical device in accordance with one embodiment of the invention.

The optical device of the present invention is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In addition, in this specification, expressions such as "first material layer disposed on/over a second material layer", may indicate the direct contact of the first material layer and the second material layer, or it may indicate a non-contact state with one or more intermediate layers between the first material layer and the second material layer. In the above situation, the first material layer may not be in direct contact with the second material layer.

In addition, in this specification, relative expressions are used. For example, "lower", "bottom", "higher" or "top" are used to describe the position of one element relative to another. It should be appreciated that if a device is flipped upside down, an element that is "lower" will become an element that is "higher".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed as referring to the orientation as described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section discussed below could be termed a second element, component, region, layer, portion or section without departing from the teachings of the present disclosure.

Herein, the terms "about", "around" and "substantially" typically mean+/−20% of the stated value or range, typically +/−10% of the stated value or range, typically +/−5% of the stated value or range, typically +/−3% of the stated value or range, typically +/−2% of the stated value or range, typically +/−1% of the stated value or range, and typically +/−0.5% of the stated value or range. The stated value of the present disclosure is an approximate value. Namely, the meaning of "about", "around" and "substantially" may be implied if there is no specific description of "about". "around" and "substantially".

The following description is of the best-contemplated mode of carrying out the invention. This description is made for the purpose of illustrating the general principles of the invention and should not be taken in a limiting sense. The scope of the invention is best determined by reference to the appended claims.

Referring to FIG. 1, in accordance with one embodiment of the present invention, an optical device 10 is provided. FIG. 1 shows a schematic diagram of the optical device 10.

As shown in FIG. 1, the optical device 10 includes a time-of-flight (TOF) sensor array 12, a light source 14, a photon conversion thin film 16 and a module lens 18. The light source 14 is disposed adjacent to the time-of-flight sensor array 12. For example, the time-of-flight sensor array 12 and the light source 14 are disposed on the same substrate 15. The photon conversion thin film 16 is disposed above the time-of-flight sensor array 12 and the light source 14. The module lens 18 is disposed above the photon conversion thin film 16. Specifically, the light source 14 emits a first light 14a (for example, blue light) with a first wavelength towards the photon conversion thin film 16 to be converted into a second light 14b (for example, long wavelength infrared (LWIR)) with a second wavelength received by the time-of-flight sensor array 12. The second wavelength is longer than the first wavelength.

In some embodiments, the time-of-flight sensor array 12 includes a silicon time-of-flight sensor, a germanium (Ge) time-of-flight sensor, an indium gallium arsenide (InGaAs) time-of-flight sensor, an organic photodiode (OPD) time-of-flight sensor or a perovskite time-of-flight sensor, but the present invention is not limited thereto.

In some embodiments, the light source 14 includes alight-emitting diode (LED), a laser diode, a semi-transparent organic light-emitting diode (OLED), or a semi-transparent Perovskite light-emitting diode, but the present invention is not limited thereto.

In some embodiments, the photon conversion thin film 16 includes organic materials, inorganic materials or organic-inorganic-hybrid materials, but the present invention is not limited thereto. In some embodiments, the material of the photon conversion thin film 16 is formed as a zero-dimensional, a one-dimensional, a two-dimensional or a bulk structure, but the present invention is not limited thereto. In some embodiments, the photon conversion thin film 16 includes perovskite, carbon quantum dots (QDs), CdTe QDs, or Mn-doped ZnS QDs, but the present invention is not limited thereto. In some embodiments, the photon conversion thin film 16 absorbs short-wavelength photons (for example, the first light 14a) and emits long-wavelength photons (for example, the second light 14b). In some embodiments, the photon conversion thin film 16 has a temperature-dependent photoluminescence lifetime.

In some embodiments, the module lens 18 allows light with a wavelength longer than 7,000 nm to pass through and focuses heat on the photon conversion thin film 16.

Figure 2:
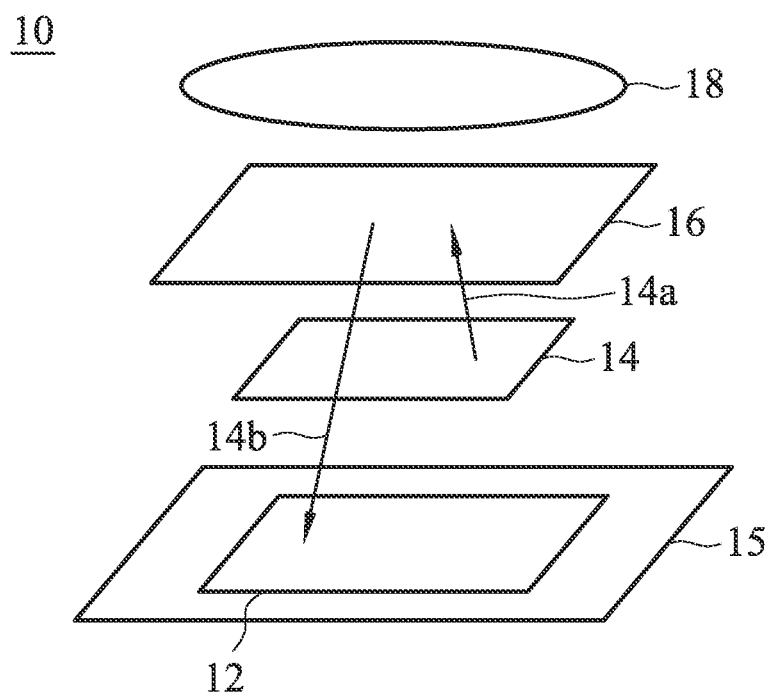
FIG. 2 shows a schematic diagram of an optical device in accordance with one embodiment of the invention.

Referring to FIG. 2, in accordance with one embodiment of the present invention, an optical device 10 is provided. FIG. 2 shows a schematic diagram of the optical device 10.

As shown in FIG. 2, the optical device 10 includes a time-of-flight (TOF) sensor array 12, a light source 14, a photon conversion thin film 16 and a module lens 18. The light source 14 is disposed between the time-of-flight sensor array 12 and the photon conversion thin film 16. For example, the time-of-flight sensor array 12 and the light source 14 are disposed on different substrates. For example, the time-of-flight sensor array 12 is disposed on a substrate 15, and the light source 14 is disposed on another substrate (not shown). The photon conversion thin film 16 is disposed above the time-of-flight sensor array 12 and the light source 14. The module lens 18 is disposed above the photon conversion thin film 16. Specifically, the light source 14 emits a first light 14a (for example, blue light) with a first wavelength towards the photon conversion thin film 16 to be converted into a second light 14b (for example, long wavelength infrared (LWIR)) with a second wavelength received by the time-of-flight sensor array 12. The second wavelength is longer than the first wavelength.

In some embodiments, the time-of-flight sensor array 12 includes a silicon time-of-flight sensor, a germanium (Ge) time-of-flight sensor, an indium gallium arsenide (InGaAs) time-of-flight sensor, an organic photodiode (OPD) time-of-flight sensor or a perovskite time-of-flight sensor, but the present invention is not limited thereto.

In some embodiments, the light source 14 includes a light-emitting diode (LED), a laser diode. a semi-transparent organic light-emitting diode (OLED), or a semi-transparent Perovskite light-emitting diode, but the present invention is not limited thereto.

In some embodiments, the photon conversion thin film 16 includes organic materials, inorganic materials or organic-inorganic-hybrid materials, but the present invention is not limited thereto. In some embodiments, the material of the photon conversion thin film 16 is formed as a zero-dimensional, a one-dimensional, a two-dimensional or a bulk structure, but the present invention is not limited thereto. In some embodiments, the photon conversion thin film 16 includes perovskite, carbon quantum dots (QDs), CdTe QDs. or Mn-doped ZnS QDs, but the present invention is not limited thereto. In some embodiments, the photon conversion thin film 16 absorbs short-wavelength photons (for example, the first light 14a) and emits long-wavelength photons (for example, the second light 14b). In some embodiments, the photon conversion thin film 16 has a temperature-dependent photoluminescence lifetime.

In some embodiments, the module lens 18 allows light with a wavelength longer than 7,000 nm to pass through and focuses heat on the photon conversion thin film 16.

Figure 3:
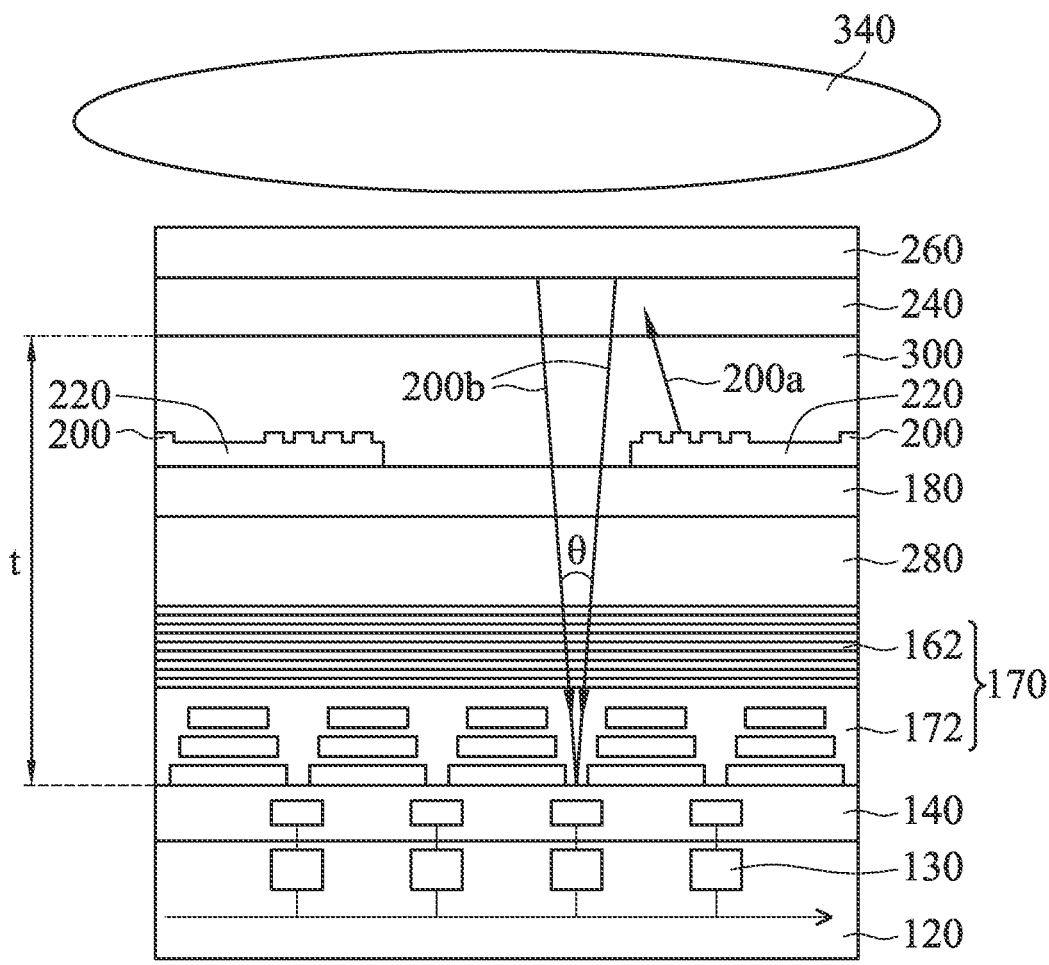
FIG. 3 shows a cross-sectional view of an optical device in accordance with one embodiment of the invention.

Referring to FIG. 3, in accordance with one embodiment of the present invention, an optical device 10 is provided. FIG. 3 shows a schematic diagram of the optical device 10.

As shown in FIG. 3, the optical device 100 includes a first substrate 120, a time-of-flight (TOF) sensor array 140, an optical component group 170, a second substrate 180, a diffraction grating coupler 200, a waveguide 220, a photon conversion thin film 240 and a longpass filter 260. The time-of-flight sensor array 140 is disposed on the first substrate 120. The optical component group 170 is disposed on the time-of-flight sensor array 140. The second substrate 180 is disposed above the optical component group 170. The diffraction grating coupler 200 and the waveguide 220 are disposed on the second substrate 180. The waveguide 220 is connected to the diffraction grating coupler 200. The photon conversion thin film 240 is disposed above the diffraction grating coupler 200 and the waveguide 220. The longpass filter 260 is disposed on the photon conversion thin film 240. Specifically, the diffraction grating coupler 200 is disposed between the time-of-flight sensor array 140 and the photon conversion thin film 240 (similar to FIG. 2). The diffraction grating coupler 200 emits a first light 200a (for example, blue light) with a first wavelength through the waveguide 220 towards the photon conversion thin film 240 to be converted into a second light 200b (for example, long wavelength infrared (LWIR)) with a second wavelength received by the time-of-flight sensor array 140. The second wavelength is longer than the first wavelength.

In some embodiments, the first substrate 120 includes a silicon substrate, but the present invention is not limited thereto. The first substrate 120 includes a readout circuit 130.

In some embodiments, the time-of-flight sensor array 140 includes a silicon time-of-flight sensor, a germanium (Ge) time-of-flight sensor, an indium gallium arsenide (InGaAs) time-of-flight sensor, an organic photodiode (OPD) time-of-flight sensor or a perovskite time-of-flight sensor, but the present invention is not limited thereto.

In FIG. 3, the optical component group 170 includes a pinhole-type collimator 172 and a filter 162. The filter 162 is disposed on the pinhole-type collimator 172. In some embodiments, the filter 162 includes a longpass (LP) filter or a narrow bandpass (NBP) filter. The pinhole-type collimator 172 controls the incident cone angle θ, and allows local field imaging. The cone angle θ is in the range of 0-5°. The local field dimension is 2t*tan(θ/2). The distance (t) between the photon conversion thin film 240 and the time-of-flight (TOF) sensor array 140 is between 100-2,000 μm. If the cone angle θ=1°, the local field dimension is between 2.74-34.9 μm; while if the cone angle θ=5°, the local field dimension is between 8.7-174 μm; while if the cone angle θ=0, the local field dimension is the same as the pin hole size. The pinhole size is in the range of 1-100 μm.

In some embodiments, the second substrate 180 includes a glass substrate, but the present invention is not limited thereto.

In some embodiments, the light source is coupled into the waveguide 220 by the diffraction grating coupler 200 that couples the light-emitting diode (LED) or a laser diode, but the present invention is not limited thereto.

In some embodiments, the photon conversion thin film 240 includes organic materials, inorganic materials or organic-inorganic-hybrid materials, but the present invention is not limited thereto. In some embodiments, the material of the photon conversion thin film 240 is formed as a zero-dimensional, a one-dimensional, a two-dimensional or a bulk structure, but the present invention is not limited thereto. In some embodiments, the photon conversion thin film 240 includes perovskite, but the present invention is not limited thereto. In some embodiments, the photon conversion thin film 240 absorbs short-wavelength photon (for example, the first light 200a) and emits long-wavelength photon (for example, the second light 200b). In some embodiments, the photon conversion thin film 240 has a temperature-dependent photoluminescence lifetime.

In some embodiments, the longpass filter 260 allows light with a wavelength longer than 7,000 nm to pass through, and blocks ambient light.

In FIG. 3, the optical device 100 further includes a first thermal insulator 280 and a second thermal insulator 300. The first thermal insulator 280 is disposed between the optical component group 170 and the second substrate 180. The second thermal insulator 300 is disposed between the diffraction grating coupler 200 and the photon conversion thin film 240. In some embodiments, the first thermal insulator 280 and the second thermal insulator 300 include air, vacuum or any suitable thermal insulating material.

In FIG. 3, the optical device 100 further includes a module lens 340 disposed above the longpass filter 260. In some embodiments, the module lens 340 allows light with a wavelength longer than 7,000 nm to pass through and focuses heat on the photon conversion thin film 240.

Figure 4:
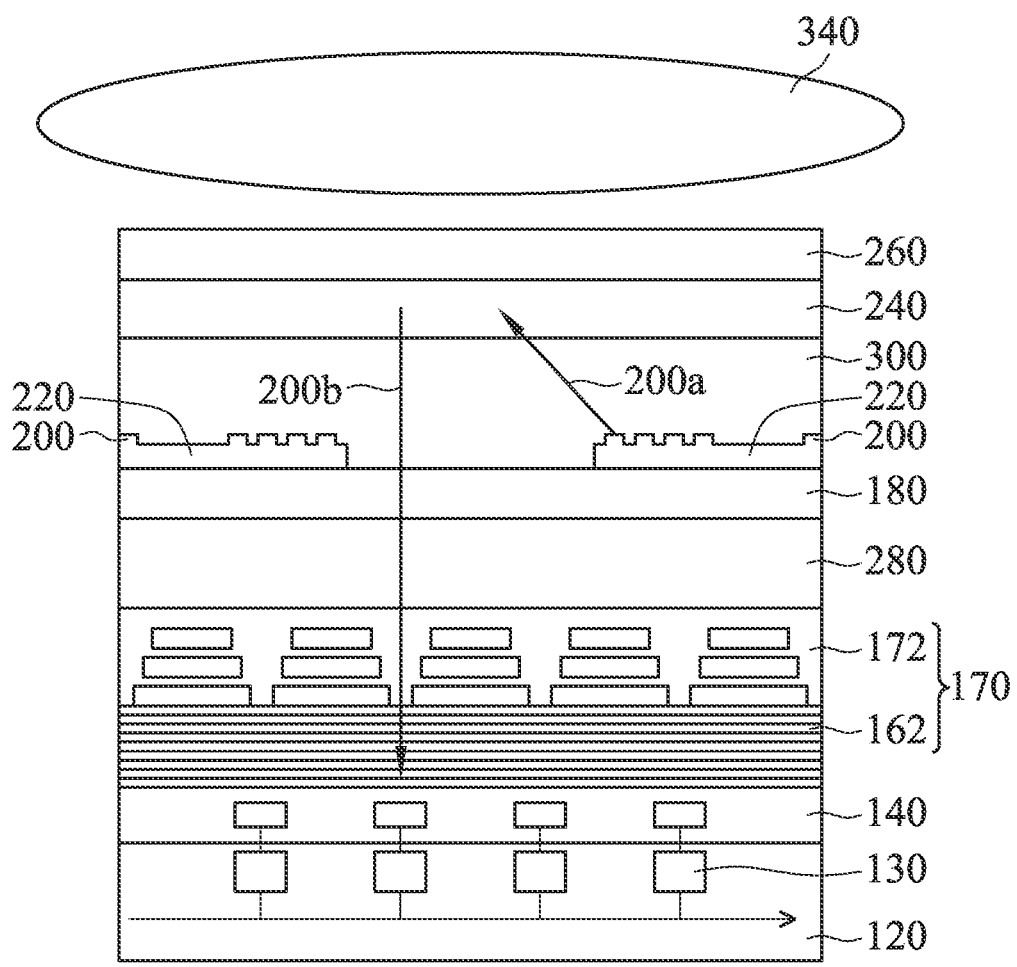
FIG. 4 shows a cross-sectional view of an optical device in accordance with one embodiment of the invention.

Referring to FIG. 4, in accordance with one embodiment of the present invention, an optical device 100 is provided. FIG. 4 shows a cross-sectional view of the optical device 100.

As shown in FIG. 4, the optical device 100 includes a first substrate 120, a time-of-flight (TOF) sensor array 140, an optical component group 170, a second substrate 180, a diffraction grating coupler 200, a waveguide 220, a photon conversion thin film 240 and a longpass filter 260. The time-of-flight sensor array 140 is disposed on the first substrate 120. The optical component group 170 is disposed on the time-of-flight sensor array 140. The second substrate 180 is disposed above the optical component group 170. The diffraction grating coupler 200 and the waveguide 220 are disposed on the second substrate 180. The waveguide 220 is connected to the diffraction grating coupler 200. The photon conversion thin film 240 is disposed above the diffraction grating coupler 200 and the waveguide 220. The longpass filter 260 is disposed on the photon conversion thin film 240. Specifically, the diffraction grating coupler 200 is disposed between the time-of-flight sensor array 140 and the photon conversion thin film 240 (similar to FIG. 2). The diffraction grating coupler 200 emits a first light 200a (for example, blue light) with a first wavelength through the waveguide 220 towards the photon conversion thin film 240 to be converted into a second light 200b (for example, long wavelength infrared (LWIR)) with a second wavelength received by the time-of-flight sensor array 140. The second wavelength is longer than the first wavelength.

In some embodiments, the first substrate 120 includes a silicon substrate, but the present invention is not limited thereto. The first substrate 120 includes a readout circuit 130.

The composition of the time-of-flight sensor array 140 is similar to that of the time-of-flight sensor array 140 in the embodiment shown in FIG. 3. It is not repeated here.

In FIG. 4, the optical component group 170 includes a filter 162 and a pinhole-type collimator 172. The pinhole-type collimator 172 is disposed on the filter 162. In some embodiments, the filter 162 includes a longpass (LP) filter or a narrow bandpass (NBP) filter.

In some embodiments, the second substrate 180 includes a glass substrate, but the present invention is not limited thereto.

In some embodiments, the light source is coupled into the waveguide 220 by the diffraction grating coupler 200 that couples the light-emitting diode (LED) or a laser diode, but the present invention is not limited thereto.

The composition, structure and property of the photon conversion thin film 240 are similar to those of the photon conversion thin film 240 in the embodiment shown in FIG. 3. It is not repeated here.

In some embodiments, the longpass filter 260 allows light with a wavelength longer than 7,000 nm to pass through, and blocks ambient light.

In FIG. 4, the optical device 100 further includes a first thermal insulator 280 and a second thermal insulator 300. The first thermal insulator 280 is disposed between the optical component group 170 and the second substrate 180. The second thermal insulator 300 is disposed between the diffraction grating coupler 200 and the photon conversion thin film 240. In some embodiments, the first thermal insulator 280 and the second thermal insulator 300 include air or any suitable insulating material.

In FIG. 4, the optical device 100 further includes a module lens 340 disposed above the longpass filter 260. In some embodiments, the module lens 340 allows light with a wavelength longer than 7,000 nm to pass through and focuses heat on the photon conversion thin film 240.

Figure 5:
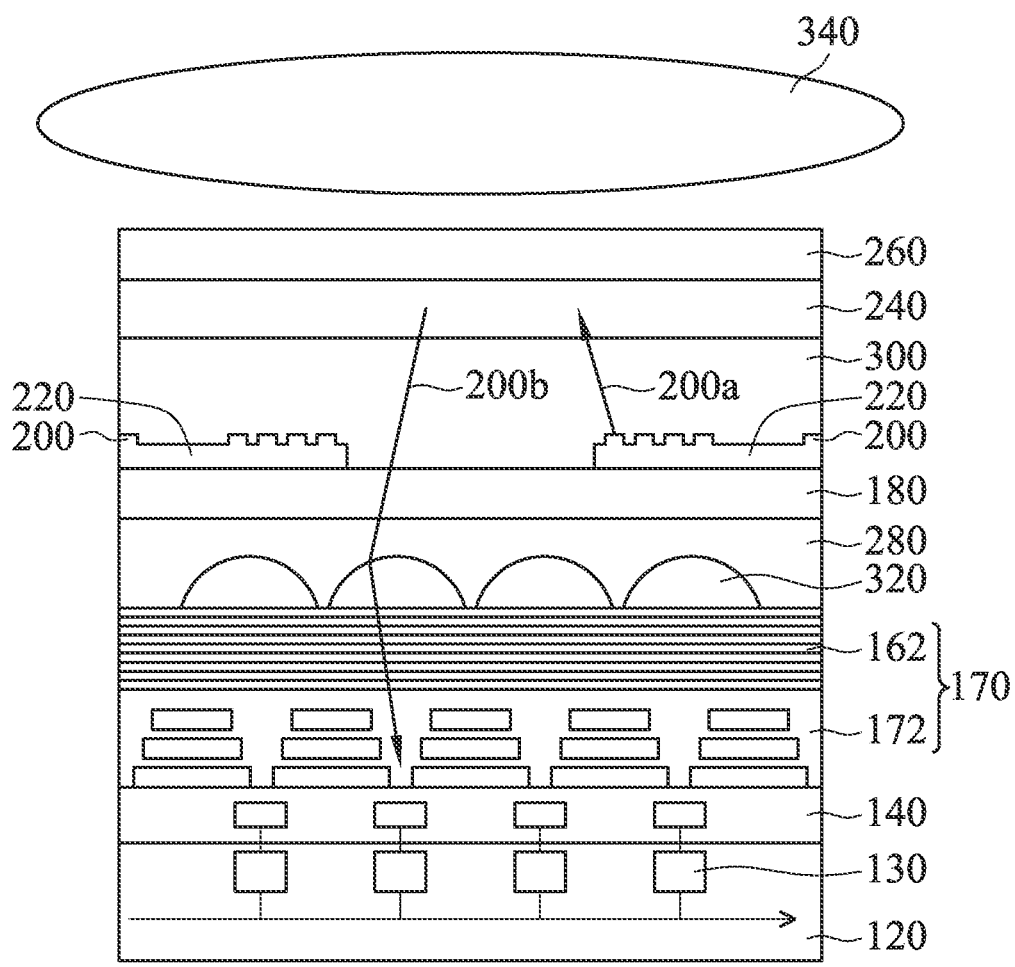
FIG. 5 shows a cross-sectional view of an optical device in accordance with one embodiment of the invention.

Referring to FIG. 5, in accordance with one embodiment of the present invention, an optical device 100 is provided. FIG. 5 shows a cross-sectional view of the optical device 100.

As shown in FIG. 5, the optical device 100 includes a first substrate 120, a time-of-flight (TOF) sensor array 140, an optical component group 170, a second substrate 180, a diffraction grating coupler 200, a waveguide 220, a photon conversion thin film 240 and a longpass filter 260. The time-of-flight sensor array 140 is disposed on the first substrate 120. The optical component group 170 is disposed on the time-of-flight sensor array 140. The second substrate 180 is disposed above the optical component group 170. The diffraction grating coupler 200 and the waveguide 220 are disposed on the second substrate 180. The waveguide 220 is connected to the diffraction grating coupler 200. The photon conversion thin film 240 is disposed above the light source 200 and the waveguide 220. The longpass filter 260 is disposed on the photon conversion thin film 240. Specifically, the diffraction grating coupler 200 is disposed between the time-of-flight sensor array 140 and the photon conversion thin film 240 (similar to FIG. 2). The diffraction grating coupler 200 emits a first light 200a (for example, blue light) with a first wavelength through the waveguide 220 towards the photon conversion thin film 240 to be converted into a second light 200b (for example, long wavelength infrared (LWIR)) with a second wavelength received by the time-of-flight sensor array 140. The second wavelength is longer than the first wavelength.

In some embodiments, the first substrate 120 includes a silicon substrate, but the present invention is not limited thereto. The first substrate 120 includes a readout circuit 130.

The composition of the time-of-flight sensor array 140 is similar to that of the time-of-flight sensor array 140 in the embodiment shown in FIG. 3. It is not repeated here.

In FIG. 5, the optical component group 170 includes a pinhole-type collimator 172 and a filter 162. The filter 162 is disposed on the pinhole-type collimator 172. In some embodiments, the filter 162 includes a longpass (LP) filter or a narrow bandpass (NBP) filter. In FIG. 5, the optical device 100 further includes a plurality of microlenses 320 disposed on the optical component group 170.

In some embodiments, the second substrate 180 includes a glass substrate, but the present invention is not limited thereto.

In some embodiments, the light source is coupled into the waveguide 220 by the diffraction grating coupler 200 that couples the light-emitting diode (LED) or a laser diode, but the present invention is not limited thereto.

The composition, structure and property of the photon conversion thin film 240 are similar to those of the photon conversion thin film 240 in the embodiment shown in FIG. 3. It is not repeated here.

In some embodiments, the longpass filter 260 allows light with a wavelength longer than 7,000 nm to pass through, and blocks ambient light.

In FIG. 5, the optical device 100 further includes a first thermal insulator 280 and a second thermal insulator 300. The first thermal insulator 280 is disposed between the optical component group 170 and the second substrate 180. The second thermal insulator 300 is disposed between the diffraction grating coupler 200 and the photon conversion thin film 240. In some embodiments, the first thermal insulator 280 and the second thermal insulator 300 include air or any suitable insulating material.

In FIG. 5, the optical device 100 further includes a module lens 340 disposed above the longpass filter 260. In some embodiments, the module lens 340 allows light with a wavelength longer than 7,000 nm to pass through and focuses heat on the photon conversion thin film 240.

Figure 6:
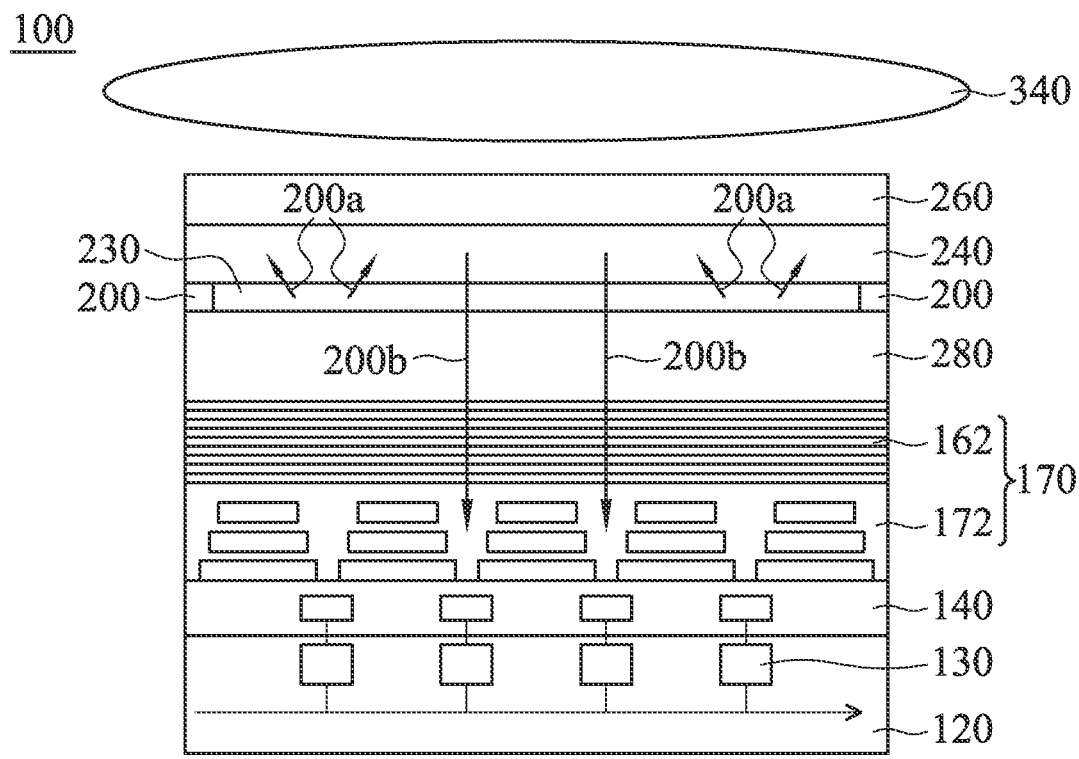
FIG. 6 shows a cross-sectional view of an optical device in accordance with one embodiment of the invention.

Referring to FIG. 6, in accordance with one embodiment of the present invention, an optical device 100 is provided. FIG. 6 shows a cross-sectional view of the optical device 100.

As shown in FIG. 6, the optical device 100 includes a substrate 120, a time-of-flight (TOF) sensor array 140, an optical component group 170, a light source 200, a LWIR transparent light guide plate (LGP) 230, a photon conversion thin film 240 and a longpass filter 260. The time-of-flight sensor array 140 is disposed on the substrate 120. The optical component group 170 is disposed on the time-of-flight sensor array 140. The light source 200 and the LWIR transparent light guide plate 230 are disposed above the optical component group 170. The LWIR transparent light guide plate 230 is connected to the light source 200. The photon conversion thin film 240 is disposed on the light source 200 and the LWIR transparent light guide plate 230. The longpass filter 260 is disposed on the light source 200 and the light guide plate 230. The light source 200 emits a first light 200a (for example, blue light) with a first wavelength through the LWIR transparent light guide plate 230 towards the photon conversion thin film 240 to be converted into a second light 200b (for example, long wavelength infrared (LWIR)) with a second wavelength received by the time-of-flight sensor array 140. The second wavelength is longer than the first wavelength.

In some embodiments, the substrate 120 includes a silicon substrate, but the present invention is not limited thereto. The substrate 120 includes a readout circuit 130.

The composition of the time-of-flight sensor array 140 is similar to that of the time-of-flight sensor array 140 in the embodiment shown in FIG. 3. It is not repeated here.

In FIG. 6, the optical component group 170 includes a pinhole-type collimator 172 and a filter 162. The filter 162 is disposed on the pinhole-type collimator 172. In some embodiments, the filter 162 includes a longpass (LP) filter or a narrow bandpass (NBP) filter. In some embodiments, in the optical component group 170, the positions of the filter 162 and the pinhole-type collimator 172 may be interchanged. For example, the pinhole-type collimator 172 is disposed on the filter 162 (similar to FIG. 4). In some embodiments, the optical device 100 may further include a plurality of microlenses 320 disposed on the optical component group 170 (similar to FIG. 5).

In some embodiments, the light source 200 includes a light-emitting diode (LED) or a laser diode, but the present invention is not limited thereto.

The composition, structure and property of the photon conversion thin film 240 are similar to those of the photon conversion thin film 240 in the embodiment shown in FIG. 3. It is not repeated here.

In some embodiments, the longpass filter 260 allows light with a wavelength longer than 7,000 nm to pass through, and blocks ambient light.

In FIG. 6, the optical device 100 further includes a thermal insulator 280. The thermal insulator 280 is disposed between the optical component group 170 and the light source 200. In some embodiments, the thermal insulator 280 includes air, vacuum or any suitable insulating material.

In FIG. 6, the optical device 100 further includes a module lens 340 disposed above the longpass filter 260. In some embodiments, the module lens 340 allows light with a wavelength longer than 7.000 nm to pass through and focuses heat on the photon conversion thin film 240.

Figure 7:
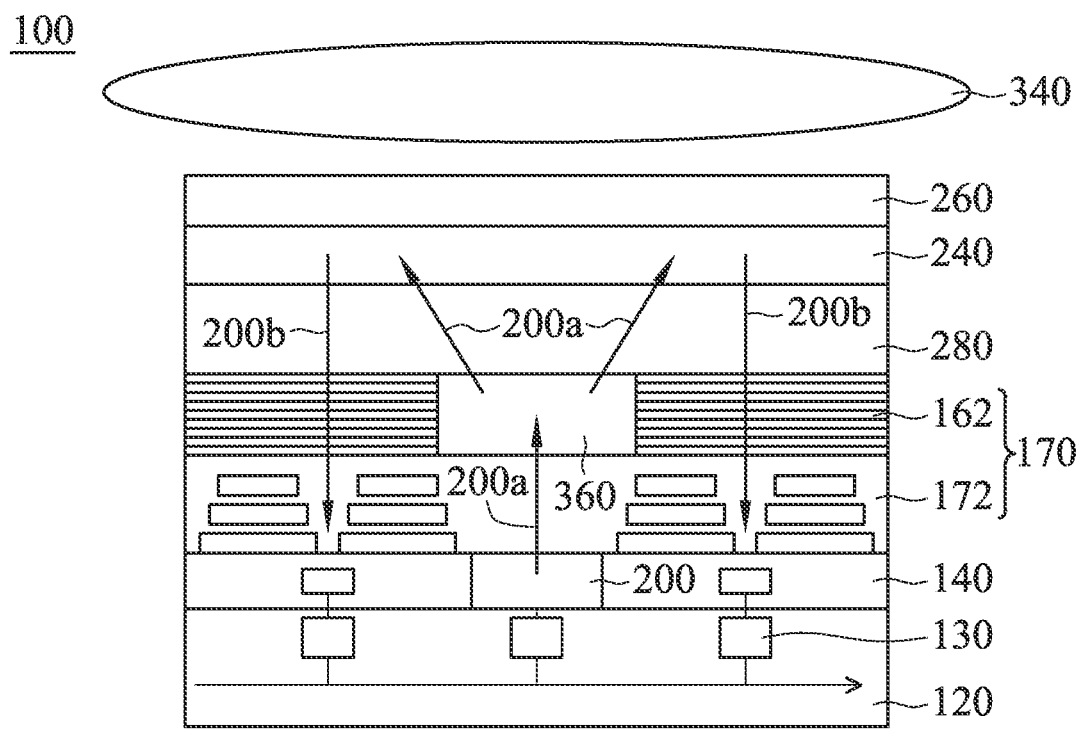
FIG. 7 shows a cross-sectional view of an optical device in accordance with one embodiment of the invention.

Referring to FIG. 7, in accordance with one embodiment of the present invention, an optical device 100 is provided. FIG. 7 shows a cross-sectional view of the optical device 100.

As shown in FIG. 7, the optical device 100 includes a substrate 120, a time-of-flight (TOF) sensor array 140, an optical component group 170, a light source 200, a photon conversion thin film 240, a longpass filter 260 and a diffuser 360. The time-of-flight sensor array 140 is disposed on the substrate 120. The optical component group 170 is disposed on the time-of-flight sensor array 140. The light source 200 is disposed in the time-of-flight sensor array 140. The photon conversion thin film 240 is disposed above the optical component group 170. The longpass filter 260 is disposed on the photon conversion thin film 240. The diffuser 360 is disposed above the light source 200 and located in the optical component group 170. Specifically, the light source 200 emits a first light 200a (for example, blue light) with a first wavelength through the diffuser 360 towards the photon conversion thin film 240 to be converted into a second light 200b (for example, long wavelength infrared (LWIR)) with a second wavelength received by the time-of-flight sensor array 140. The second wavelength is longer than the first wavelength.

In some embodiments, the substrate 120 includes a silicon substrate, but the present invention is not limited thereto. The substrate 120 includes a readout circuit 130.

The composition of the time-of-flight sensor array 140 is similar to that of the time-of-flight sensor array 140 in the embodiment shown in FIG. 3. It is not repeated here.

In FIG. 7, the optical component group 170 includes a pinhole-type collimator 172 and a filter 162. The filter 162 is disposed on the pinhole-type collimator 172. In some embodiments, the filter 162 includes a longpass (LP) filter or a narrow bandpass (NBP) filter.

In some embodiments, the light source 200 includes a light-emitting diode (LED) or a laser diode, but the present invention is not limited thereto.

In FIG. 7, the diffuser 360 is disposed above the light source 200 and located in the filter 162 of the optical component group 170.

The composition, structure and property of the photon conversion thin film 240 are similar to those of the photon conversion thin film 240 in the embodiment shown in FIG. 3. It is not repeated here.

In some embodiments, the longpass filter 260 allows light with a wavelength longer than 7,000 nm to pass through, and blocks ambient light.

In FIG. 7, the optical device 100 further includes a thermal insulator 280. The thermal insulator 280 is disposed between the optical component group 170 and the photon conversion thin film 240. In some embodiments, the thermal insulator 280 includes air or any suitable insulating material.

In FIG. 7, the optical device 100 further includes a module lens 340 disposed above the longpass filter 260. In some embodiments, the module lens 340 allows light with a wavelength longer than 7,000 nm to pass through and focuses heat on the photon conversion thin film 240.

Figure 8:
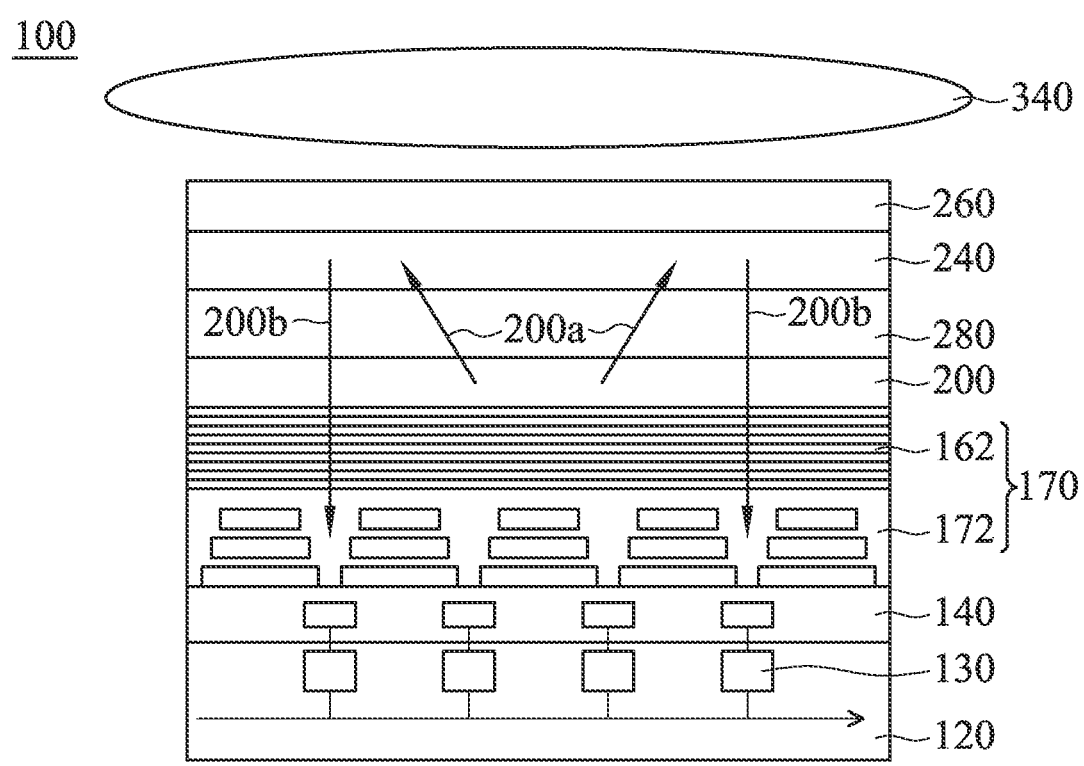
FIG. 8 shows a cross-sectional view of an optical device in accordance with one embodiment of the invention.

Referring to FIG. 8, in accordance with one embodiment of the present invention, an optical device 100 is provided. FIG. 8 shows a cross-sectional view of the optical device 100.

As shown in FIG. 8, the optical device 100 includes a substrate 120, a time-of-flight (TOF) sensor array 140, an optical component group 170, a light source 200, a photon conversion thin film 240 and a longpass filter 260. The time-of-flight sensor array 140 is disposed on the substrate 120. The optical component group 170 is disposed on the time-of-flight sensor array 140. The light source 200 is disposed on the optical component group 170. The photon conversion thin film 240 is disposed above the light source 200. The longpass filter 260 is disposed on the photon conversion thin film 240. Specifically, the light source 200 is disposed between the time-of-flight sensor array 140 and the photon conversion thin film 240 (similar to FIG. 2). The light source 200 emits a first light 200a (for example, blue light) with a first wavelength towards the photon conversion thin film 240 to be converted into a second light 200b (for example, long wavelength infrared (LWIR)) with a second wavelength received by the time-of-flight sensor array 140. The second wavelength is longer than the first wavelength.

In some embodiments, the substrate 120 includes a silicon substrate, but the present invention is not limited thereto. The substrate 120 includes a readout circuit 130.

The composition of the time-of-flight sensor array 140 is similar to that of the time-of-flight sensor array 140 in the embodiment shown in FIG. 3. It is not repeated here.

In FIG. 8, the optical component group 170 includes a pinhole-type collimator 172 and a filter 162. The filter 162 is disposed on the pinhole-type collimator 172. In some embodiments, the filter 162 includes a longpass (LP) filter or a narrow bandpass (NBP) filter. In some embodiments, in the optical component group 170, the positions of the filter 162 and the pinhole-type collimator 172 may be interchanged. For example, the pinhole-type collimator 172 is disposed on the filter 162 (similar to FIG. 4).

In some embodiments, the light source 200 includes a semi-transparent organic light-emitting diode (OLED) or a semi-transparent Perovskite light-emitting diode, but the present invention is not limited thereto.

The composition, structure and property of the photon conversion thin film 240 are similar to those of the photon conversion thin film 240 in the embodiment shown in FIG. 3. It is not repeated here.

In some embodiments, the longpass filter 260 allows light with a wavelength longer than 7,000 nm to pass through, and blocks ambient light.

In FIG. 8, the optical device 100 further includes a thermal insulator 280. The thermal insulator 280 is disposed between the light source 200 and the photon conversion thin film 240. In some embodiments, the thermal insulator 280 includes air or any suitable insulating material. The light source 200 includes a semi-transparent organic light-emitting diode (OLED) or a semi-transparent Perovskite light-emitting diode, In FIG. 8, the optical device 100 further includes a module lens 340 disposed above the longpass filter 260. In some embodiments, the module lens 340 allows light with a wavelength longer than 7,000 nm to pass through and focuses heat on the photon conversion thin film 240.

Figure 9:
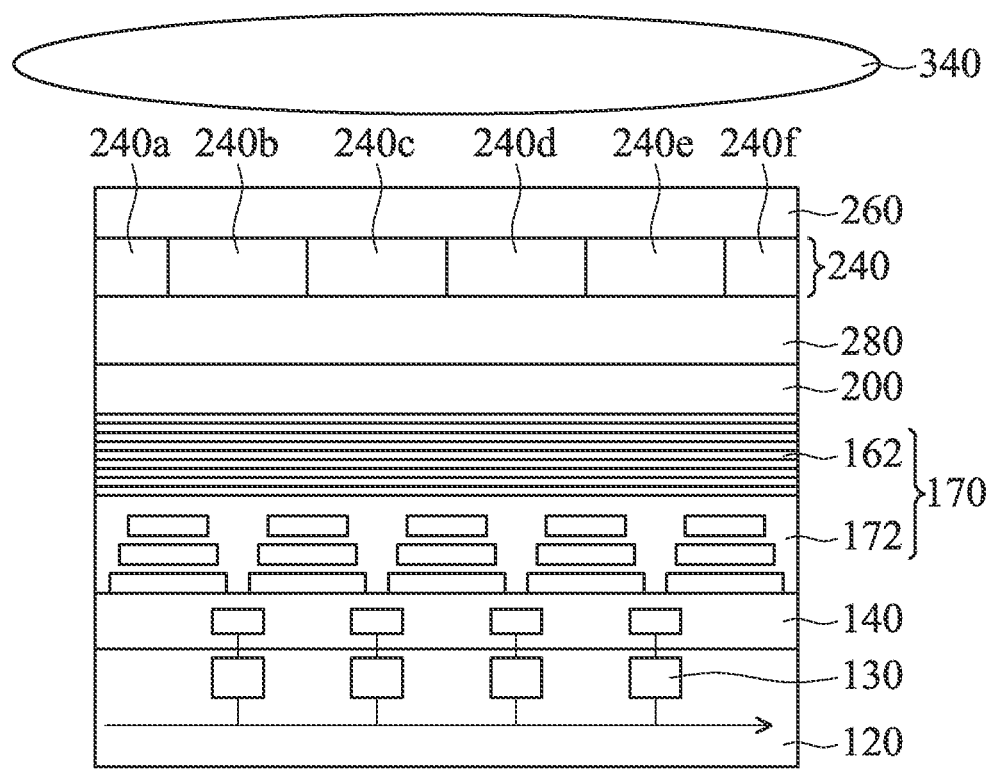
FIG. 9 shows a cross-sectional view of an optical device in accordance with one embodiment of the invention.

Referring to FIG. 9, in accordance with one embodiment of the present invention, an optical device 100 is provided. FIG. 9 shows a cross-sectional view of the optical device 100.

The embodiment of the optical device 100 shown in FIG. 9 is similar to that of the optical device 100 shown in FIG. 8. The distinction therebetween is that, in FIG. 9, the photon conversion thin film 240 is pixelated with different color conversion materials. For example, the photon conversion thin film 240 is pixelated with different color conversion materials (240a, 240b, 240c, 240d, 240e and 240f). Each color conversion materials have different photoluminescence sensitivity in different temperature range, making the device have broad temperature sensing range.

Figure 10:
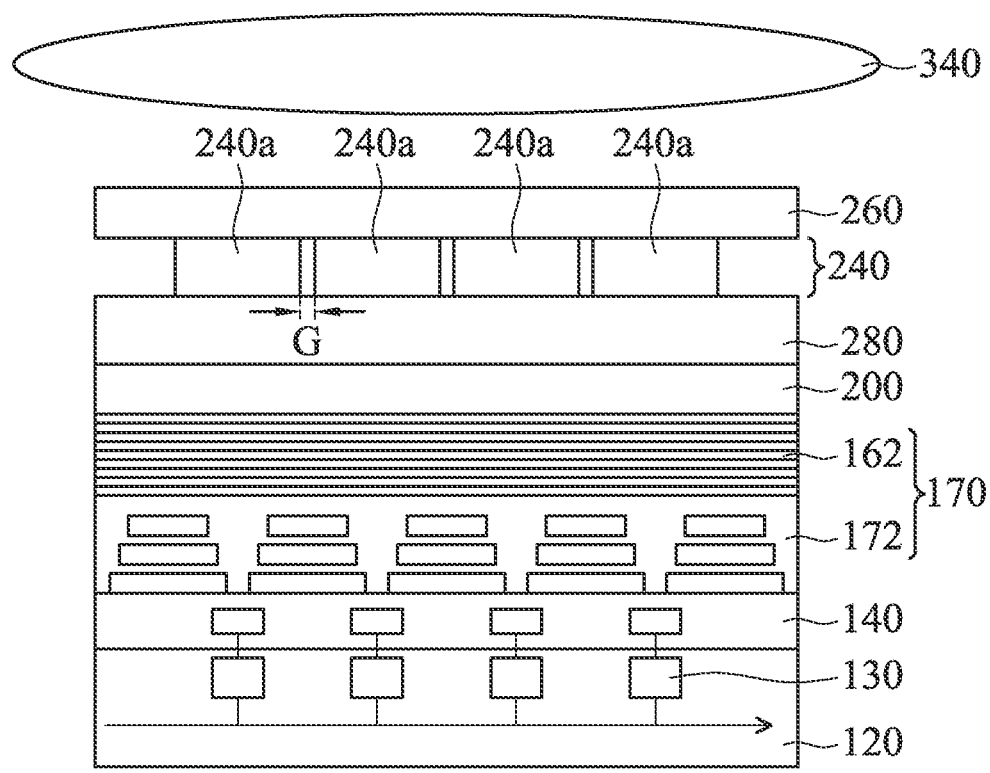
FIG. 10 shows a cross-sectional view of an optical device in accordance with one embodiment of the invention.

Referring to FIG. 10, in accordance with one embodiment of the present invention, an optical device 100 is provided. FIG. 10 shows a cross-sectional view of the optical device 100.

The embodiment of the optical device 100 shown in FIG. 10 is similar to that of the optical device 100 shown in FIG. 8. The distinction therebetween is that, in FIG. 10, the photon conversion thin film 240 is pixelated with the same color conversion material 240a. Specifically, there is an air gap "G" between the adjacent pixelated photon conversion thin film, reducing the thermal conduction between them and therefore enhancing the temperature resolution.

Figure 11:
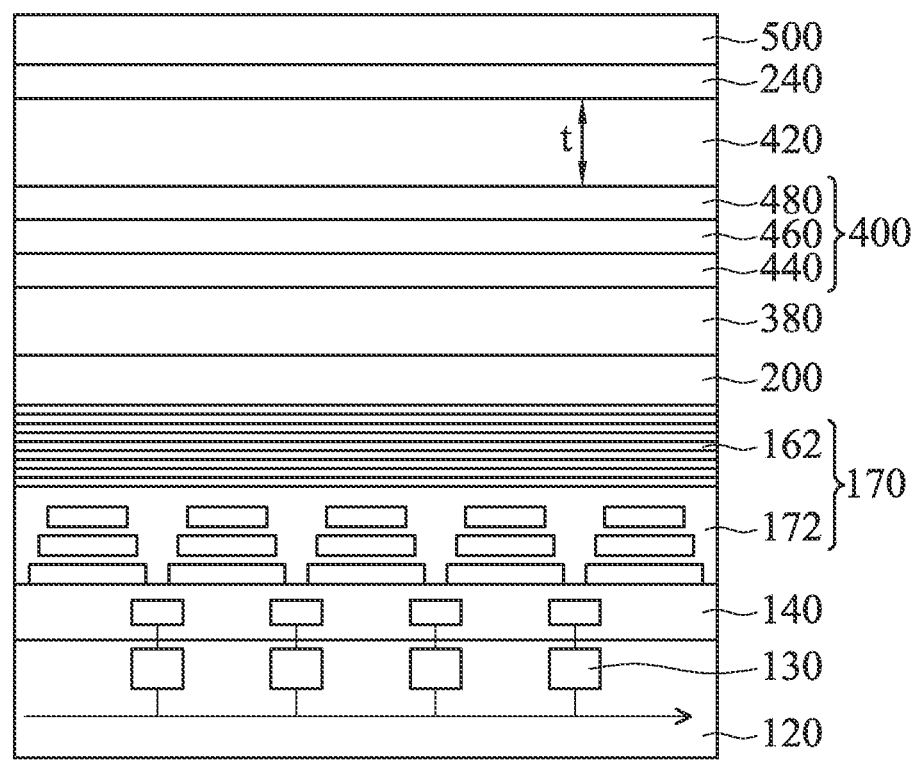
FIG. 11 shows a cross-sectional view of an optical device in accordance with one embodiment of the invention.

Referring to FIG. 11, in accordance with one embodiment of the present invention, an optical device 100 is provided. FIG. 11 shows a cross-sectional view of the optical device 100.

The embodiment of the optical device 100 shown in FIG. 11 is similar to that of the optical device 100 shown in FIG. 8. The distinction therebetween is that, in FIG. 11, a LWIR reflection mirror 400 and an optical spacer 420 are inserted between the light source 200 and the photon conversion thin film 240.

Referring to FIG. 11, the following design concentrates on the method of light management in the ToF-type thermography. On a glass substrate 380, a long-wavelength infrared (LWIR) reflection mirror 400 is integrated into the optical device 100 (i.e. TOF-type thermography), which improves the heat absorption efficiency on the photon conversion thin film 240, but still allows visible light passing back and forth. An optical spacer 420 with λ/4n optical path is inserted between the LWIR reflection mirror 400 and the photon conversion thin film 240 to make a large optical electric field located on the photon conversion thin film 240, where λ is the wavelength of LWIR (~10 μm), and n is the refractive index of the optical spacer. The optical spacer 420 requires low-k materials at both visible and LWIR regions, therefore polymers such as PEI or PMMA as well as some inorganic materials such as ZnS are good candidates. The optimal thickness "t" of the optical spacer 420 depends on the refractive index of the materials, t=λ/4n, where λ is the wavelength of LWIR (~10 μm), and n is the refractive index of the optical spacer. For example, for photons with 10 μm wavelength, 1.67 μm PMMA spacer allows the strongest LWIR electric field concentrating on the photon conversion thin film 240.

In the LWIR reflection mirror 400, a dielectric/metal/dielectric (DMD) stack for visible (400-600 nm) transparent but LWIR (7 μm-14 μm) highly reflective is designed. The LWIR reflection mirror 400 includes a stack of a first dielectric layer 440, a metal layer 460 and a second dielectric layer 480, and the metal layer 460 is sandwiched between the first dielectric layer 440 and the second dielectric layer 480. The photon energy absorbed by a metal layer is proportional to nkd/λ, where n is the refractive index, k is the extinction coefficient, and d is the thickness of the metal layer. Transparency can be obtained even in metals if the refractive index n of a metal approaches zero. Among all metals, Ag has n closest to zero (n~0, k~3) in the visible range but has large n and k (n>7, k>40) in the LWIR, therefore it is a good candidate for visible (400-600 nm) transparent but LWIR (7 μm-14 μm) highly reflective, but the present invention is not limited to Ag, Cu and Au are also able to design the transparent layer. To further enhance the transmittance of Ag thin film in the visible range, it is sandwiched between high-dielectric-constant and high-refractive-index metal oxide (MO) thin films (i.e. the first dielectric layer 440 and the second dielectric layer 480). The high-dielectric-constant MO layers can suppress surface plasmon, showing increased optical-transmittance (>70%); on the other hand the high-refractive-index MO layer with thickness of a few tens of nanometers improves the optical transparency by making the net admittance of the stack match closely that of the light-incident medium. In the LWIR region, however, this is no longer the case, causing highly reflective properties in LWIR.

The Fresnel equation can be simplified as $$R = \left|\frac{N_A - N_B}{N_A + N_B}\right|^2$$

with normal incident light. The larger difference of the refractive index between the neighboring layers, the higher reflection of the film is. Therefore, even though in the visible region the film is transparent, it becomes highly reflective in the LWIR region due to large difference of the refractive index between metal and neighboring layers.

In some embodiments, the LWIR reflection mirror 400 with 15 nm of Ag sandwiched between $TiO_2$ layers is designed. The transmission at 400 nm, 500 nm, and 600 nm wavelengths with various thicknesses of the top $TiO_2$ layer and the bottom $TiO_2$ layer is estimated. The simulation shows that 30-nm top $TiO_2$ layer and 25-nm bottom $TiO_2$ layer give the optimal solution.

In this stack, the transmission in the visible is 90%, while the reflection in the LWIR is almost 100%, which is good for TOF-type thermography.

In FIG. 11, a LWIR absorber layer 500, such as $SiO_2$ and $TiO_2$, is inserted above the photon conversion thin film 240 as a dual function IR absorber and protection layer. The simulated results show that 50-nm $SiO_2$ capping layer in combination with λ/4n cavity allows 60% of photons been absorbed.

The following uses the algorithm to calculate the photoluminescence (PL) lifetime of the photon conversion thin film. The light source uses a light-emitting diode (LED) or a laser diode. The light-emitting diode (LED) and the laser diode emit periodic pulse light or modulated sine wave light.

When a periodic modulated sine wave light is emitted, the emission of the signals of the periodic light from the light source is synchronized with the operation of the readout circuit. The analog signals are read at various times by the readout circuit and converted into digital signals via an A/D converter. The photoluminescence lifetime of the photon conversion thin film is then calculated using equation (I) and converted into a temperature map.

$$\tau = -\frac{t}{\ln(I(t)/I(0))} \quad (I)$$

In equation (I), t represents time, I(0) represents initial signal intensity, I(t) represents signal intensity at time t, and π represents photoluminescence lifetime.

When a modulated sine wave light is emitted, the emission of signals of the modulated sine wave light from the light source is synchronized with the operation of the readout circuit. The analog signals are read at various phase delays (0°, 90°, 180° and 270°) by the readout circuit and converted into digital signals via an A/D converter. The photoluminescence lifetime of the photon conversion thin film is then calculated using equations (II) and (III) and converted into a temperature map.

$$\Delta\phi = \arctan\left(\frac{I_0 - I_2}{I_3 - I_1}\right) \quad (II)$$

In equation (II), $I_0$ represents signal intensity at 0° phase delay. $I_1$ represents signal intensity at 90° phase delay, $I_2$ represents signal intensity at 180° phase delay, $I_3$ represents signal intensity at 270° phase delay, and $\Delta\phi$ represents the phase difference between the light source and photon emitted from the photon conversion thin film.

$$\tau = \frac{\tan(\Delta\phi)}{2\pi\nu} \quad (III)$$

In equation (III), ν represents light source modulation frequency, and τ represents photoluminescence lifetime.

Example 1

Verification of an Organic Photodiode (OPD) Time-of-Flight Sensor Applied to a Thermal Imaging Sensor The equations used in the algorithm include:

$$f_{-3dB}^{-2} = \left(\frac{3.5}{2\pi t_{tr}}\right)^{-2} + \left(\frac{1}{2\pi RC}\right)^{-2}$$

In the equation, $t_{tr}$ represents the transit time, RC represents the RC delay, and $f_{-3dB}$ represents the bandwidth.

$$t_{tr} = \frac{L^2}{\mu V}$$

In the equation, L represents the layer thickness, V represents the applied voltage, μ represents the carrier mobility, and $t_{tr}$ represents the transit time.

$$C = \frac{A\varepsilon_0\varepsilon_r}{L}$$

In the equation, A represents the area of the photodiode, $\varepsilon_0$ represents the vacuum dielectric constant, $\varepsilon_r$ represents the relative dielectric constant, L represents the layer thickness, and C represents the capacitance.

(1) Table 1 shows the temperature resolution (° C.) of the organic photodiode (OPD) time-of-flight sensor under the conditions of the thickness (L) of the organic photodiode layer of 1,000 nm and different pixel sizes.

TABLE 1

L = 1,000 nm

| Pixel size (μm) | RC delay (ns) | Transit time ($t_{tr}$)(ns) | Temperature resolution (° C.) |
|---|---|---|---|
| 2323 | 60,000 | 50 | 3,000 |
| 500 | 2,000 | 50 | 100 |
| 50 | 20 | 50 | 2.5 |
| 5 | 0.2 | 50 | 2.5 |

(2) Table 2 shows the temperature resolution (° C.) of the organic photodiode (OPD) time-of-flight sensor under the conditions of the thickness (L) of the organic photodiode layer of 500 nm and different pixel sizes.

TABLE 2

L = 500 nm

| Pixel size (μm) | RC delay (ns) | Transit time ($t_{tr}$)(ns) | Temperature resolution (° C.) |
|---|---|---|---|
| 2323 | 120,000 | 12.5 | 6,000 |
| 500 | 4,000 | 12.5 | 200 |
| 50 | 40 | 12.5 | 20 |
| 5 | 0.4 | 12.5 | 0.625 |

(3) Table 3 shows the temperature resolution (° C.) of the organic photodiode (OPD) time-of-flight sensor under the conditions of the thickness (L) of the organic photodiode layer of 250 nm and different pixel sizes.

TABLE 3

L = 250 nm

| Pixel size (μm) | RC delay (ns) | Transit time ($t_{tr}$)(ns) | Temperature resolution (° C.) |
|---|---|---|---|
| 2323 | 240,000 | 3.1 | 12,000 |
| 500 | 8,000 | 3.1 | 400 |
| 50 | 80 | 3.1 | 4 |
| 5 | 0.8 | 3.1 | 0.155 |

The results indicate that the smaller the pixel size and the thinner the OPD layer, the faster the response time obtained. For example, the temperature resolution (° C.) of the organic photodiode (OPD) time-of-flight sensor under the conditions of the thickness (L) of the organic photodiode layer of 250 nm and the pixel size of 5 μm achieves 0.155, meeting the needs of the thermal imaging sensor.

Example 2

Verification of a Perovskite Time-of-Flight Sensor Applied to a Thermal Imaging Sensor (1) Table 4 shows the temperature resolution (° C.) of the perovskite time-of-flight sensor under the conditions of the thickness (L) of the perovskite layer of 1,000 nm and different pixel sizes.

TABLE 4

| | | L = 1,000 nm | |
|---|---|---|---|
| Pixel size (μm) | RC delay (ns) | Transit time ($t_{tr}$)(ns) | Temperature resolution (° C.) |
| 2323 | 60,000 | 0.0050 | 3,000 |
| 500 | 2,000 | 0.0050 | 100 |
| 50 | 20 | 0.0050 | 1 |
| 5 | 0.2 | 0.0050 | 0.01 |

(2) Table 5 shows the temperature resolution (° C.) of the perovskite time-of-flight sensor under the conditions of the thickness (L) of the perovskite layer of 500 nm and different pixel sizes.

TABLE 5

| | | L = 500 nm | |
|---|---|---|---|
| Pixel size (μm) | RC delay (ns) | Transit time ($t_{tr}$)(ns) | Temperature resolution (° C.) |
| 2323 | 120,000 | 0.00125 | 6,000 |
| 500 | 4,000 | 0.00125 | 200 |
| 50 | 40 | 0.00125 | 2 |
| 5 | 0.4 | 0.00125 | 0.02 |

(3) Table 6 shows the temperature resolution (° C.) of the perovskite time-of-flight sensor under the conditions of the thickness (L) of the perovskite layer of 250 nm and different pixel sizes.

TABLE 6

| | | L = 250 nm | |
|---|---|---|---|
| Pixel size (gm) | RC delay (ns) | Transit time ($t_{tr}$)(ns) | Temperature resolution (° C.) |
| 2323 | 240,000 | 0.0003 | 12,000 |
| 500 | 8,000 | 0.0003 | 400 |
| 50 | 80 | 0.0003 | 4 |
| 5 | 0.8 | 0.0003 | 0.04 |

The results indicate that the smaller the pixel size and the thinner the perovskite layer, the faster the response time obtained. For example, the temperature resolution (° C.) of the perovskite time-of-flight sensor under the conditions of the thickness (L) of the perovskite layer of 250 nm and the pixel size of 5 μm achieves 0.04, meeting the needs of the thermal imaging sensor.

Example 3

Verification of a Si Time-of-Flight Sensor Applied to a Thermal Imaging

The resolution of state of art Si ToF sensor is ~20 ps, corresponding to temperature resolution of 0.001° C.

In the present invention, the optical device (i.e. thermal imaging sensor) is integrated by at least a time-of-flight (TOF) sensor, a photon conversion thin film (with the specific material and composition) and a light source. The photon conversion thin film absorbs the heat of the object to form the distribution of different heat zones. The light source emits a short-wavelength light (for example, blue light) to excite the photon conversion thin film to be converted into a long-wavelength light (for example, long wavelength infrared (LWIR)) received by the time-of-flight sensor. In the photon conversion thin film, the zone with a higher temperature emits light faster than the zone with a lower temperature. The time-of-flight sensor measures the light-achieving time and calculates the heat map. The present optical design can reduce the size of the device and improve temperature resolution.

Although some embodiments of the present invention and their advantages have been described in detail, it should be understood that various changes, substitutions and alterations can be made herein without departing from the spirit and scope of the invention as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and operations described in the specification. As one of ordinary skill in the art will readily appreciate from the disclosure of the present disclosure, processes, machines, manufacture, compositions of matter, means, methods, or operations, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or operations.

What is claimed is:

1. An optical device, comprising:
   a time-of-flight (TOF) sensor array;
   a photon conversion thin film disposed above the time-of-flight sensor array;
   a light source which emits light with a first wavelength towards the photon conversion thin film to be converted into light with a second wavelength received by the time-of-flight sensor array, wherein the second wavelength is longer than the first wavelength; and
   an optical component group disposed on the time-of-flight sensor array, wherein the optical component group comprises a pinhole-type collimator and a filter, and the filter comprises a longpass (LP) filter or a narrow bandpass (NBP) filter.

2. The optical device as claimed in claim 1, wherein the time-of-flight sensor array comprises a silicon time-of-flight sensor, a germanium (Ge) time-of-flight sensor, an indium gallium arsenide (InGaAs) time-of-flight sensor, an organic photodiode (OPD) time-of-flight sensor or a perovskite time-of-flight sensor.

3. The optical device as claimed in claim 1, further comprising a plurality of microlenses disposed on the optical component group.

4. The optical device as claimed in claim 1, wherein the photon conversion thin film comprises organic materials, inorganic materials or organic-inorganic-hybrid materials forming a zero-dimensional, a one-dimensional, a two-dimensional or a bulk structure, wherein the photon conversion thin film absorbs short-wavelength photons and emits long-wavelength photons, and has a temperature-dependent photoluminescence lifetime.

5. The optical device as claimed in claim 1, wherein the photon conversion thin film is pixelated with different color conversion materials or with a same color conversion material, and when the photon conversion thin film is pixelated with the same color conversion material, there is an air gap between the adjacent pixelated photon conversion thin film.

6. The optical device as claimed in claim 1, wherein the light source is disposed adjacent to the time-of-flight sensor array.

7. The optical device as claimed in claim 1, wherein the light source is disposed between the time-of-flight sensor array and the photon conversion thin film.

8. The optical device as claimed in claim 7, further comprising a waveguide connected to the light source.

9. The optical device as claimed in claim 7, further comprising a light guide plate (LGP) connected to the light source.

10. The optical device as claimed in claim 1, further comprising a diffuser disposed on the light source, wherein the light source is disposed in the time-of-flight sensor array.

11. The optical device as claimed in claim 7, wherein the light source comprises a semi-transparent organic light-emitting diode (OLED) or a semi-transparent Perovskite light-emitting diode.

12. The optical device as claimed in claim 1, further comprising a longpass filter disposed on the photon conversion thin film, wherein the longpass filter allows light with a wavelength longer than 7,000 nm to pass through, and blocks ambient light.

13. The optical device as claimed in claim 1, further comprising a module lens disposed above the photon conversion thin film, wherein the module lens allows light with a wavelength longer than 7,000 nm to pass through and focuses heat on the photon conversion thin film.

14. The optical device as claimed in claim 7, further comprising a thermal insulator disposed between the light source and the photon conversion thin film.

15. The optical device as claimed in claim 8, wherein the light source comprises a light-emitting diode (LED) or a laser diode connected to the waveguide, and the light-emitting diode (LED) and the laser diode emit periodic pulse light or modulated sine wave light.

16. The optical device as claimed in claim 1, further comprising an optical spacer with $\lambda/4n \pm 0.2$ μm optical path inserted between a long-wavelength infrared (LWIR) reflection mirror and the photon conversion thin film to make an optical electric field of IR light located on the photon conversion thin film, wherein $\lambda$ is a wavelength of the IR light, and n is a refractive index of the optical spacer, wherein the LWIR reflection mirror comprises a stack of a first dielectric layer, a metal layer and a second dielectric layer, and the metal layer is sandwiched between the first dielectric layer and the second dielectric layer, wherein the first dielectric layer and the second dielectric layer have a refractive index greater than 1.3 and a thickness ranging from 5 nm to 200 nm, and the metal layer has a refractive index less than 1 in a visible region and a thickness ranging from 1 nm to 50 nm.

17. The optical device as claimed in claim 1, further comprising a LWIR absorber layer with a thickness ranging from 5 nm to 500 nm disposed on the photon conversion thin film to enhance IR absorption, wherein the LWIR absorber layer comprises $TiO_2$, $SiO_2$ or $Al_2O_3$.

18. The optical device as claimed in claim 15, wherein emission of signals of the periodic sine wave light is synchronized with operation of a readout circuit, and the signals are read at various times by the readout circuit and converted into digital signals via an A/D converter, and a photoluminescence lifetime of the photon conversion thin film is calculated using equation (I) and converted into a temperature map, wherein $$\tau = -\frac{t}{\ln(I(t)/I(0))} \quad \text{(I)}$$

in equation (I), t represents time, I(0) represents initial signal intensity, I(t) represents signal intensity at time t, and τ represents the photoluminescence lifetime.

19. The optical device as claimed in claim 15, wherein emission of signals of the modulated sine wave light is synchronized with operation of a readout circuit, and the signals are read at various phase delays by the readout circuit and converted into digital signals via an A/D converter, and a photoluminescence lifetime of the photon conversion thin film is calculated using equations (II) and (III) and converted into a temperature map, wherein $$\Delta\phi = \arctan\left(\frac{I_0 - I_2}{I_3 - I_1}\right) \quad \text{(II)}$$

in equation (II), $I_0$ represents signal intensity at 0° phase delay, $I_1$ represents signal intensity at 90° phase delay, $I_2$ represents signal intensity at 180° phase delay, $I_3$ represents signal intensity at 270° phase delay, and Δφ represents phase difference between the light source and photon emitted from the photon conversion thin film, and $$\tau = \frac{\tan(\Delta\phi)}{2\pi v} \quad \text{(III)}$$

in equation (III), Δφ represents the phase difference between the light source and photon emitted from the photon conversion thin film, v represents light source modulation frequency, and τ represents the photoluminescence lifetime.

* * * * *